(12) United States Patent
Wilkes

(10) Patent No.: US 6,832,852 B2
(45) Date of Patent: Dec. 21, 2004

(54) GUSSETED FLEXIBLE BOTTLE WITH FITMENT AND METHOD OF FABRICATION

(76) Inventor: Kenneth R. Wilkes, 7 Stuyvesant Rd., Asheville, NC (US) 28803

( * ) Notice: Subject to any disclaimer, the term of this patent is extended or adjusted under 35 U.S.C. 154(b) by 119 days.

(21) Appl. No.: 10/195,097

(22) Filed: Jul. 11, 2002

(65) Prior Publication Data

US 2003/0202719 A1 Oct. 30, 2003

Related U.S. Application Data

(63) Continuation-in-part of application No. 10/133,436, filed on Apr. 27, 2002, now abandoned.

(51) Int. Cl.[7] .............................................. B65D 30/20
(52) U.S. Cl. ...................... 383/120; 383/104; 383/906; 222/92; 222/107
(58) Field of Search .......................... 383/120, 80, 104, 383/906; 222/92, 107; D9/302

(56) References Cited

U.S. PATENT DOCUMENTS

| | | | |
|---|---|---|---|
| 3,380,646 A | | 4/1968 | Doyen et al. .................. 229/57 |
| 4,669,124 A | * | 5/1987 | Kimura ........................ 383/80 |
| 4,718,778 A | * | 1/1988 | Ichikawa ..................... 383/100 |
| D307,385 S | * | 4/1990 | Kimura ........................ D9/302 |
| 5,348,525 A | | 9/1994 | Buchanan .................... 493/213 |
| 5,660,477 A | * | 8/1997 | Ichikawa ...................... 383/80 |
| 5,678,732 A | * | 10/1997 | Gianpaolo ................... 222/107 |
| 5,918,984 A | | 7/1999 | LaFleur et al. ................ 383/8 |
| 6,126,315 A | * | 10/2000 | Ichikawa et al. ............. 383/43 |
| 6,193,416 B1 | * | 2/2001 | Kawamata et al. ......... 383/104 |
| 6,220,702 B1 | * | 4/2001 | Nakamura et al. ............ 347/86 |
| D451,793 S | * | 12/2001 | Berman ....................... D9/305 |
| 6,549,744 B2 | * | 4/2003 | Terazawa et al. ........... 399/262 |

* cited by examiner

Primary Examiner—Jes F. Pascua

(57) ABSTRACT

A flexible bottle having a gusseted body section and a neck section comprised of narrowed portions of the side panels and gussets of the body section, with a fitment in the neck section. The bottle has a flat bottom that may be created by tapering the webs forming the bottom at about 45 degrees. The body has a substantially square or rectangular cross section when filled, but may be contoured in the vertical direction. A process for fabricating the bottle is also disclosed which involves feeding webs, including a pair of gussets, creating perimeter seals around only the top portion of the bottle, inserting the fitment from the input end of the machine in the direction of web travel, forming the remainder of the perimeter seams, detaching the nascent bottle from the web, and sealing the neck section of the bottle to the fitment by clamping the neck section with a heated clamp, and preferably repeating the seal operation at a different radial angle. Sealing the fitment by application of ultrasonic energy is also disclosed.

22 Claims, 9 Drawing Sheets

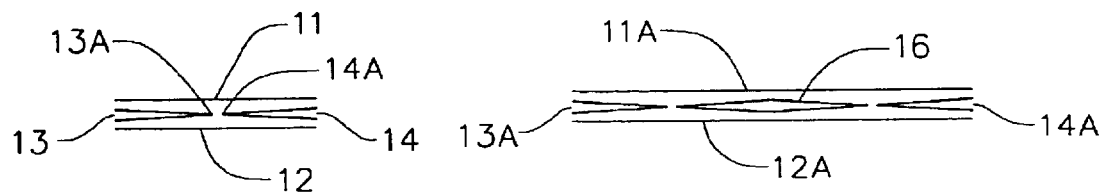
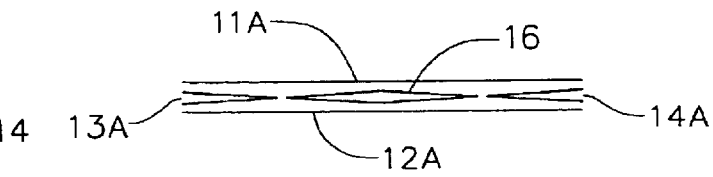
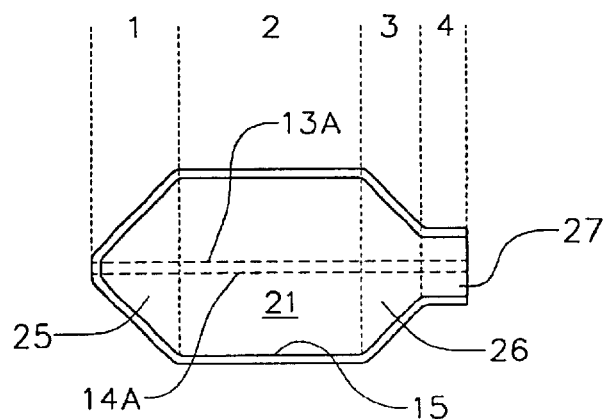
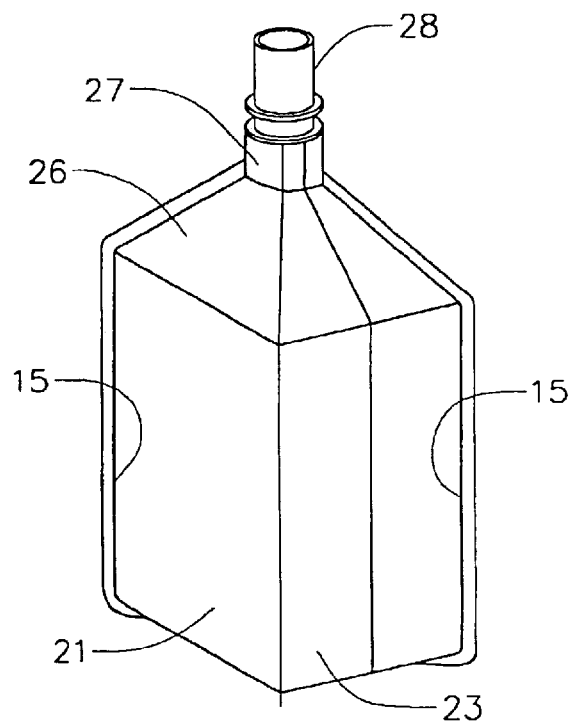
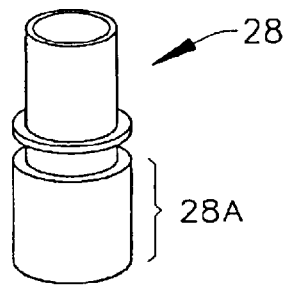

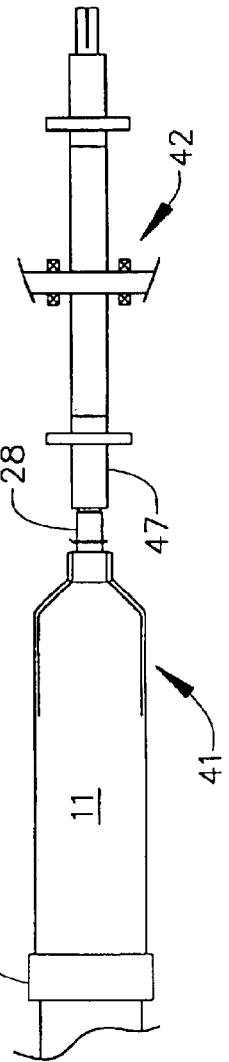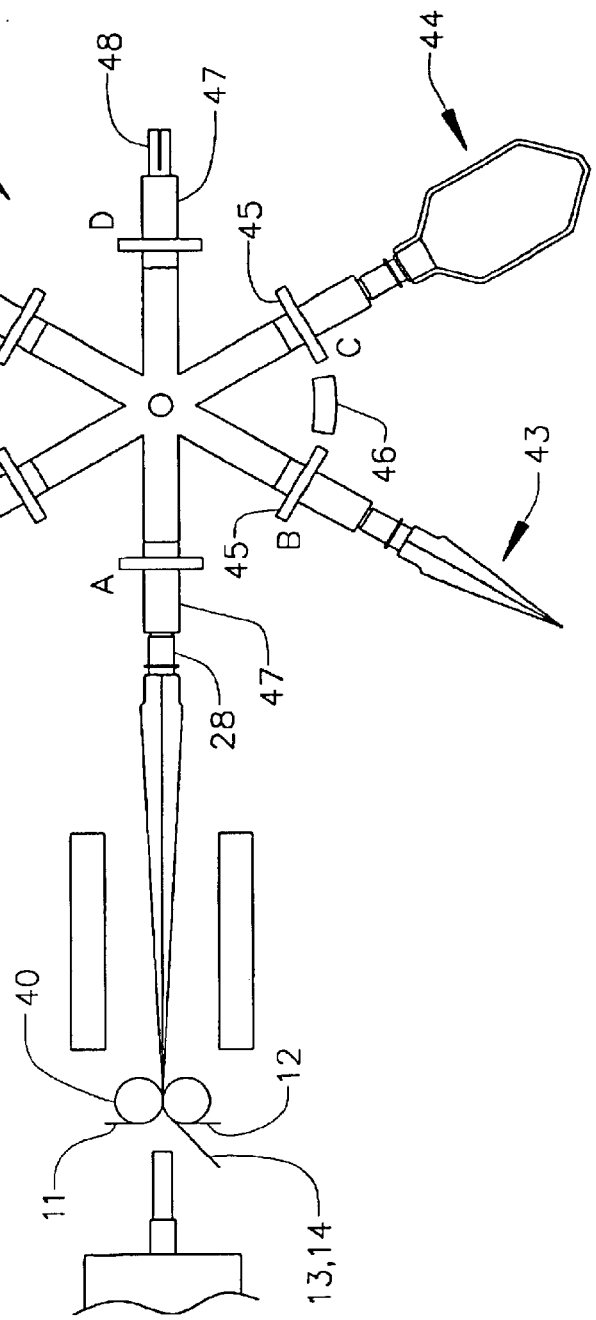
FIG. 4A
FIG. 4B

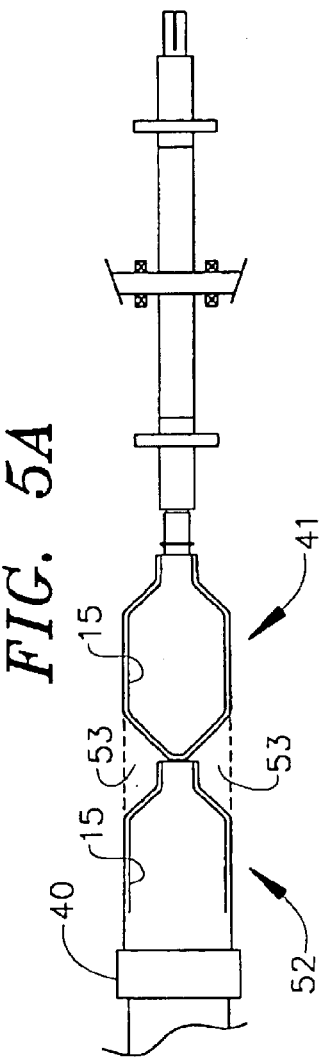
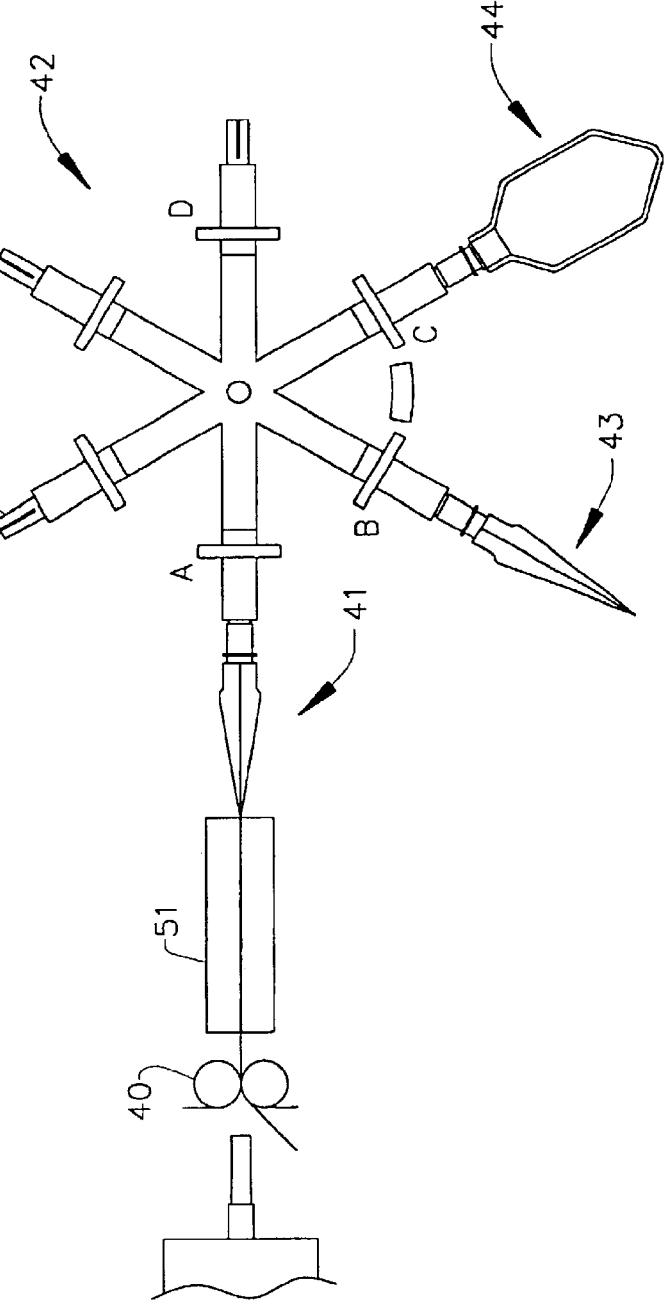
FIG. 5A
FIG. 5B

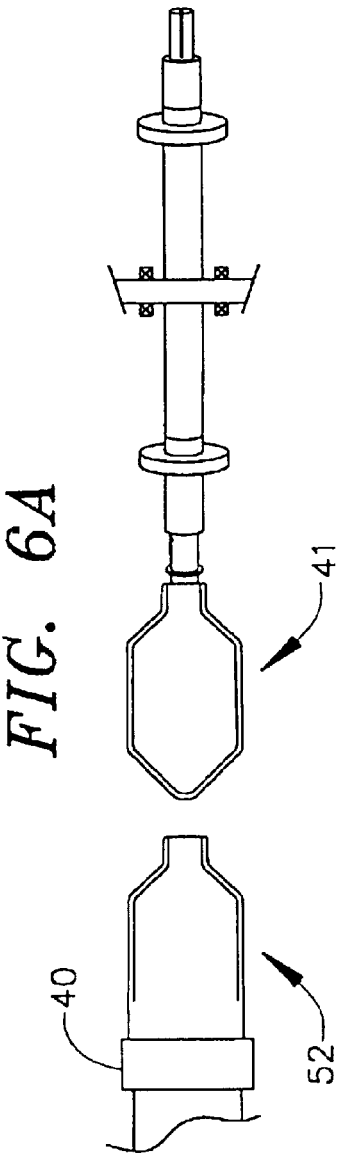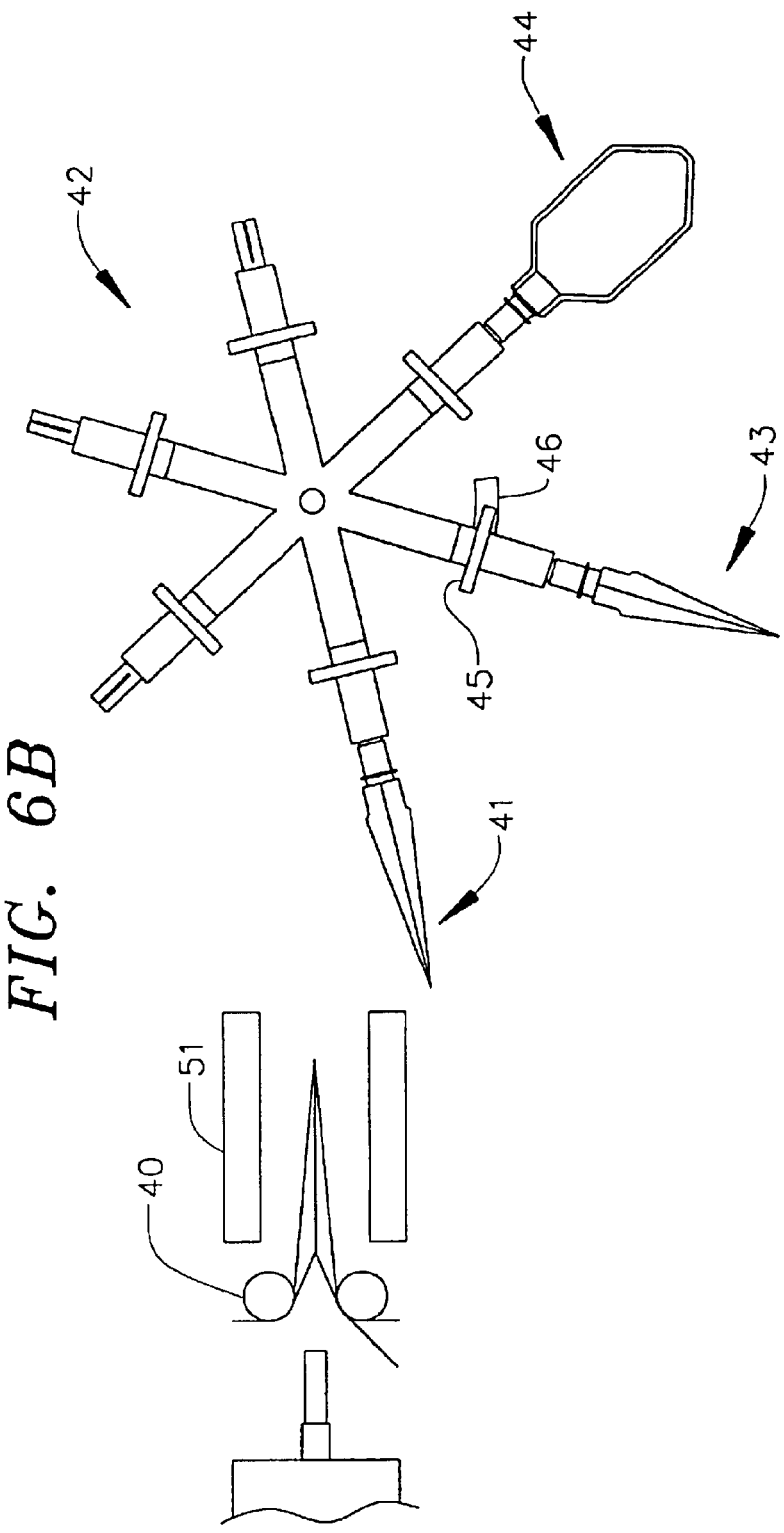
FIG. 6A
FIG. 6B

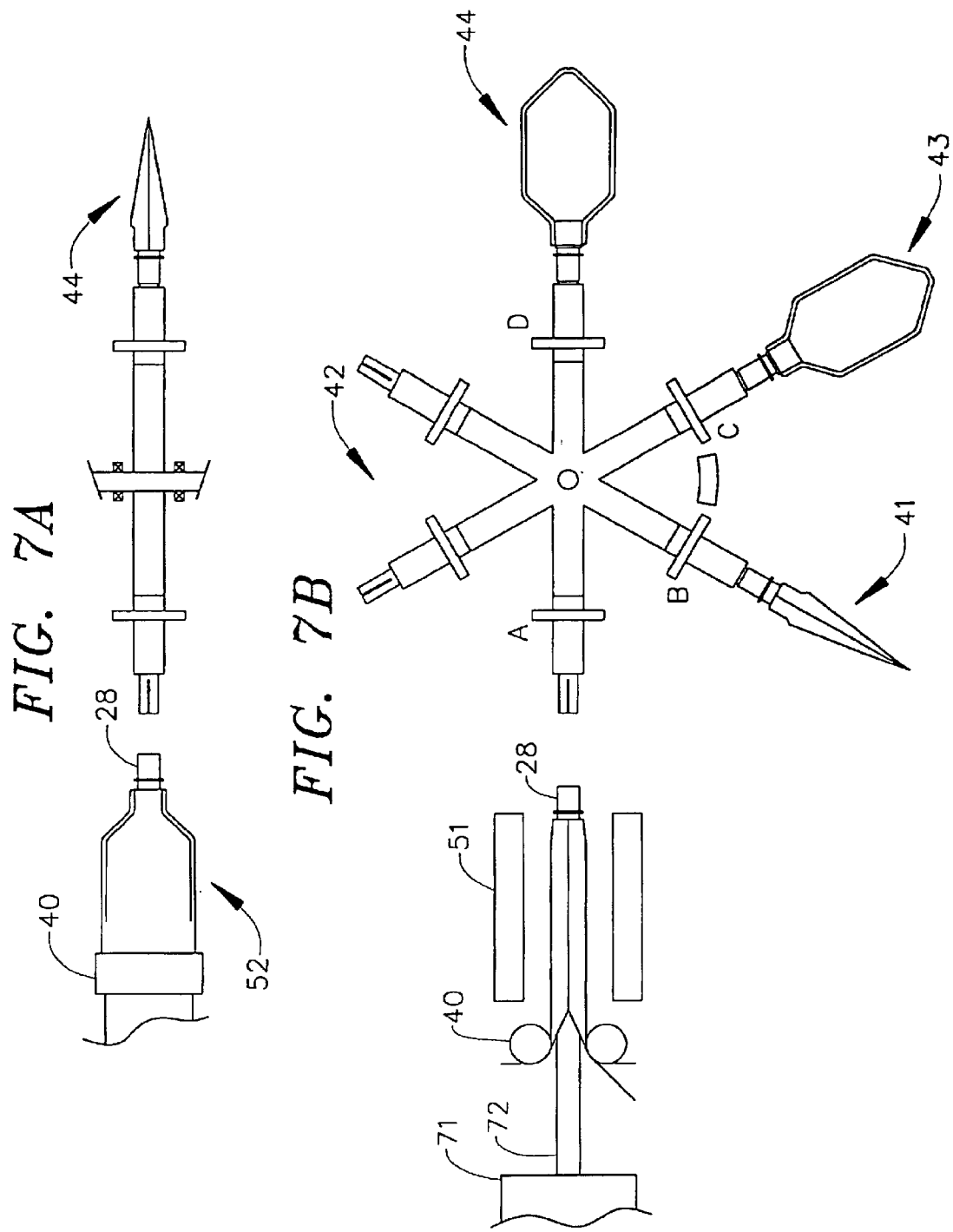

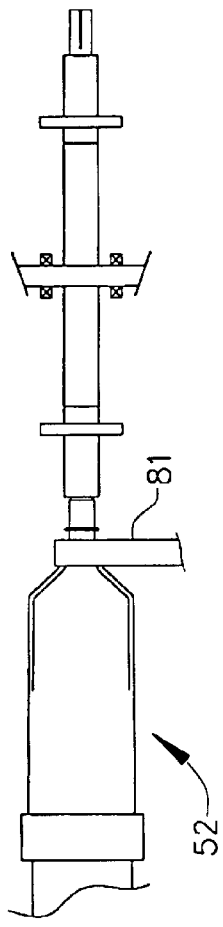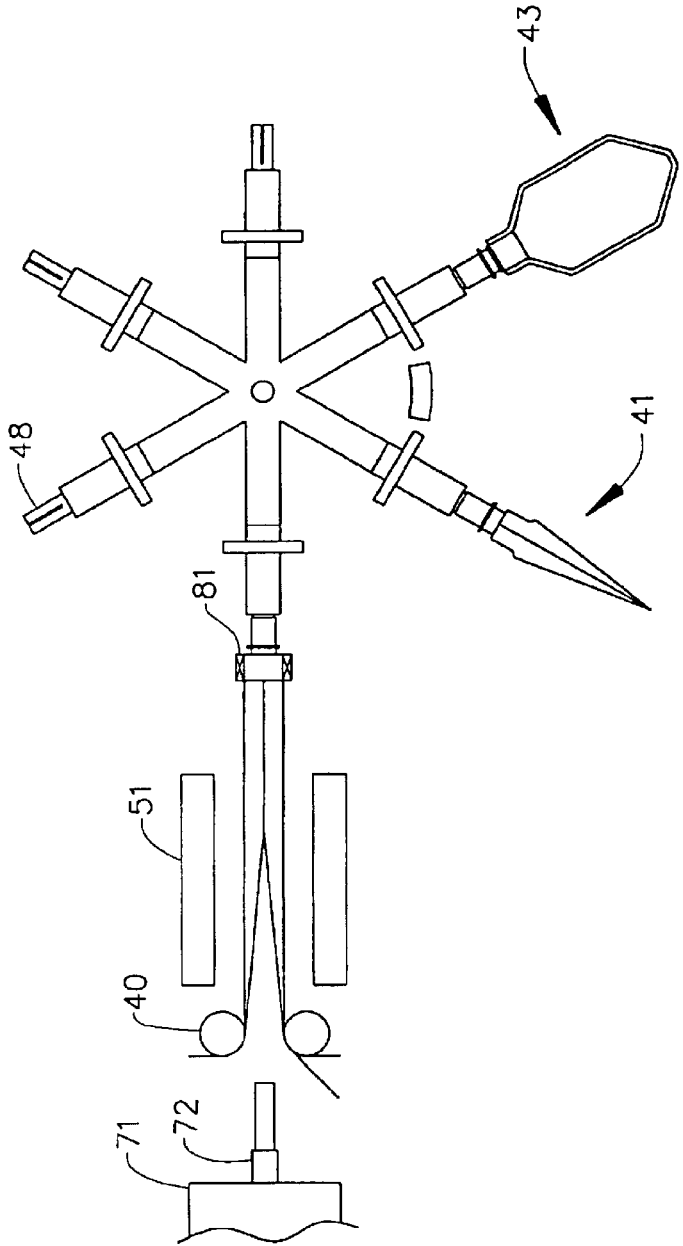

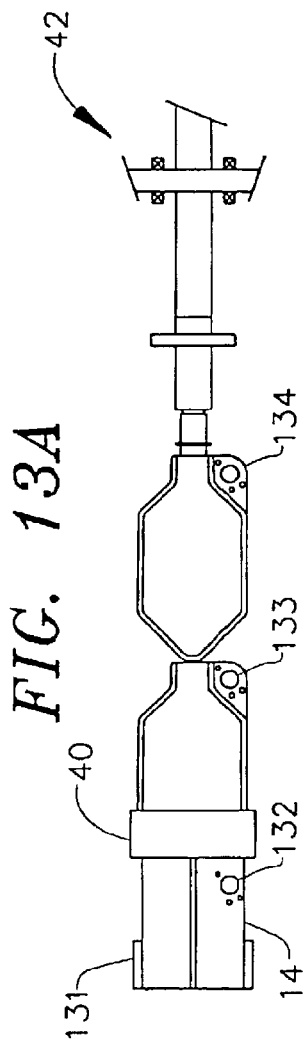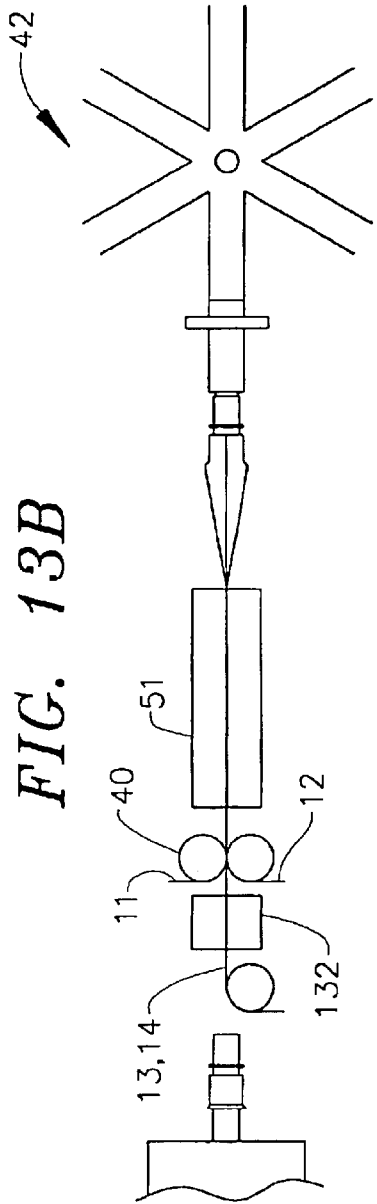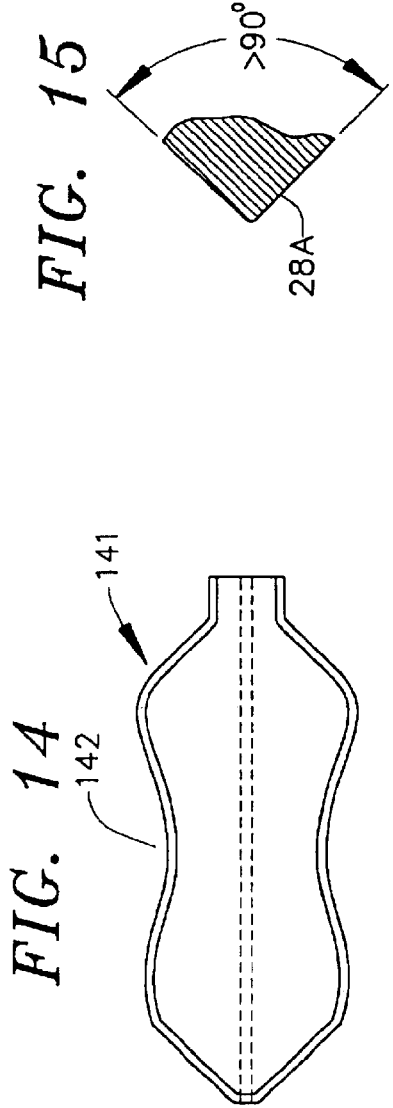

GUSSETED FLEXIBLE BOTTLE WITH FITMENT AND METHOD OF FABRICATION

PRIOR APPLICATION

This is a Continuation-In-Part of application Ser. No. 10/133,436, filed Apr. 27, 2002, now abandoned.

BACKGROUND OF THE INVENTION

"Stand-up" plastic pouches or bottles for holding liquids and other pourable products are becoming more popular, in part because of the desire to minimize solid waste, in part because of cost, and in part for other reasons. An early stand-up pouch design (U.S. Pat. No. 3,380,646) was devised by the Doyen Brothers in France. That pouch design, including many variants, is still in use today. It is, in fact, the dominant style. The basic Doyen design consists of two flat sheets seamed together along their sides, with a "W" fold running along the bottom. When the pouch is filled, the "W" opens and provides a base on which the pouch can stand. The original Doyen design showed the top being sealed straight across, but subsequent modifications include fitments to allow the pouch to be reclosed after opening.

One difficulty in adding a fitment to a Doyen pouch (and to many other pouch designs as well) is that, according to prior art fitment sealing methods, the fitment must be of the "canoe" style to create a joint that can be reliably sealed. The canoe type of fitment is an attempt to minimize the change in direction of pouch material as it comes into contact with the fitment, and in so doing, improve the integrity of the joint where the two sides of the pouch come together at the fitment. However, even the use of a canoe shaped fitment does not completely solve the difficulties in sealing a fitment into a pouch, and a more reliable sealing means is desirable. The present invention provides such a means.

A "canoe" style fitment is characterized by having a sealing surface that includes relatively sharp changes in direction around the sealing periphery so as to permit the pieces of material being sealed to the fitment to approach the fitment sealing surface (laterally) at relatively shallow angles. Or, put another way, as two webs separate to go around the fitment in opposite directions, the angle of divergence is relatively small. Canoe style fitments are illustrated in, e.g., U.S. Pat. Nos. 5,660,477, 4,415,085, and 4,732,299.

There are at least two other shortcomings of Doyen style pouches with fitments, as compared with the present invention. One is that, because the Doyen body tapers from the bottom to the top, and the present invention has a body that approximates a rectangular parallelepiped, for a given volume contained, the bottle of the present invention requires substantially less material to fabricate. Since material cost is a large part of the cost of flexible packaging, this is a significant factor. Another shortcoming of the Doyen style (and other ungusseted styles), compared to the present invention is that, because the upper body is fabricated from two flat sheets, when the pouch is partly full, the weight of the fitment tends to cause the top of the pouch to fold over, rather than stand erect.

Gusseted bottles (but without fitment) have been made in the past (see U.S. Pat. No. 6,193,416, Kawamata et al., U.S. Pat. No. 6,126,315, Ichikawa et al., and U.S. Pat. No. 5,918,984, LaFleur et al.) Obviously, without a fitment, these prior art containers do not have the utility of the present invention.

U.S. Pat. No. 5,660,477, Ichikawa, discloses a gusseted pouch with a fitment. The fitment shown has flanges protruding from the central section; these create even more sealing problems than a conventional canoe style fitment. Additionally, because of the way the top of the pouch is configured, i.e., the gussets are closed at the top, the fitment weight tends to cause this pouch to fold over when partly full, in a manner very much like a Doyen pouch with fitment.

SUMMARY OF THE INVENTION

The invented bottle which could, but preferably does not, utilize canoe style fitments is fabricated from flexible films (i.e., thin plastic, foil, paper, or the like) fed as webs from rolls of material. The bottle includes a gusseted body section that opens so as to form a substantially square or rectangular cross section. The gussets are terminated at the bottom of the bottle to form a substantially flat base, providing stability when the bottle is partially or wholly filled. The top portion of the bottle includes a fitment passing through a necked down portion of the bottle. The fitment is preferably sealed to the neck in two or more sealing operations carried out at different radial angles, preferably, but not necessarily, 90°, thus assuring an adequate seal between the fitment and the bottle neck around the entire periphery of the fitment.

For purposes of clarity, as pictured herein the fitment is illustrated without a closure. It will be appreciated that threaded, snap, and/or other types of closures are contemplated even though none is shown in the figures.

As opposed to requiring the use of canoe style fitments, as mentioned in the Background section of this Specification, the present invention permits, and preferably utilizes, "cylindrical base" fitments. The sealing surface (or "base") of a cylindrical base style fitment (as that term is used in the present application) is preferably (but not necessarily) substantially parallel to the axis of the fitment, as in the canoe style, but does not include external corners at sharply acute angles around its circumference, as do canoe style fitments. Rather, the circumference is preferably comprised of smooth and preferably convex curves. Having the circumference comprised of smooth curves is intended to facilitate the sealing of web material to the base of the fitment with two overlapping sealing steps applied from different directions. The cross sectional shape of the sealing area of a cylindrical base fitment is preferably circular, but may be oval, or have some other curved shape. While the word "cylindrical" is used herein to help define a "non-canoe" style of fitment, it should be understood that the fitment may be tapered somewhat (axially) to facilitate insertion or for other reasons.

Alternatively, instead of the sealing surface area of a cylindrical base fitment being comprised of smooth curves, the sealing surface of a cylindrical base fitment (as that term is used in this specification) may include intersections at an angle, provided that the angle is not so acute as to make a second sealing step difficult or impractical. Intersection angles that are greater than about 90° are generally deemed to be satisfactory, hence the term "cylindrical base", as used in this specification, refers to the base (i.e., the sealing surface) of a fitment wherein the webs of material surrounding and sealed to the fitment diverge at angles greater than about 90° as they separate to encircle the fitment. FIG. 15, which is a fragmentary sectional view of a cylindrical base fitment, illustrates the approximate minimum angle of approach of surfaces of what is termed here as a "cylindrical base" fitment. The base of a cylindrical base style of fitment could, for example, have a hexagonal shape (in cross section).

The preferred method of fabricating the invented bottle generally comprises:

1. feeding two or more webs of material in face to face contact into a fabricating machine, the webs including a pair of gussets,
2. creating perimeter seals for the bottle around a part of the circumference, including the neck portion of the bottle, and shaping the bottle by cutting away areas at the edges of the webs,
3. separating at least one of the incoming webs from the remainder of the webs upstream of the neck portion and inserting a fitment into the neck portion of the bottle, the insertion motion being through what eventually will become the bottom of the bottle,
4. forming the remainder of the perimeter seals of the bottle,
5. severing the bottle from the web,
6. clamping the bottle material to the fitment with a heated clamping means to create a seal between the bottle material and the fitment,
7. Clamping the bottle material to the fitment with a heated clamp a second time, the second clamping being at a different radial angle.

BRIEF DESCRIPTION OF THE DRAWINGS

FIG. 1A is an exploded end on view of the webs of the constituent material as fed into the fabricating machine (one-up configuration).

FIG. 1B is an exploded end on view of the webs of the constituent material as fed into the fabricating machine (two-up configuration).

FIG. 2 is a flattened top view of a bottle according to the invention, without fitment.

FIG. 3 is a trimetric view of a completed and filled bottle according to the invention.

FIG. 3A is a trimetric view of a representative fitment for use in the invented bottle.

FIGS. 4 through 9 are schematic views of various steps of the presently preferred fabricating process, as performed in a fabricating machine. The Figures marked "A" are top views of the web during the process step, whereas those marked "B" are side views at the same point in time.

FIGS. 13A and 13B are schematic views of one process step in the fabrication process for making an alternate embodiment of the invented bottle. FIG. 13A is a top view of the web and 13B a side view taken at the time the step is being performed.

FIG. 14 is a plan view of a flattened bottle according to another embodiment of the invention, without the fitment.

FIG. 15 is a fragmentary sectional view of the base section of a fitment which could be used in connection with the invention.

DETAILED DESCRIPTION OF THE INVENTION

Figure 8A:
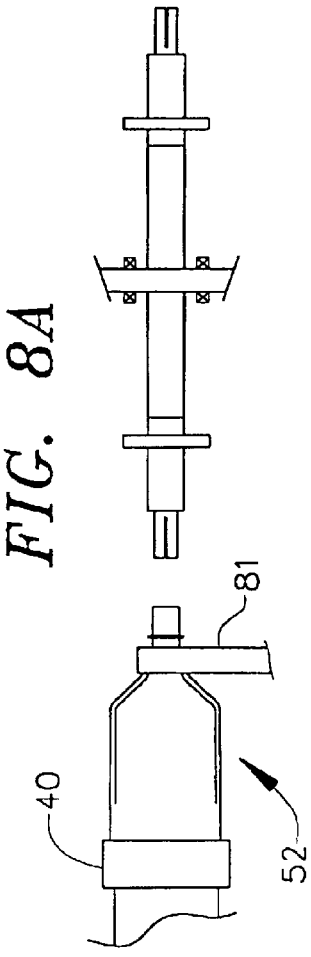
Figure 8B:
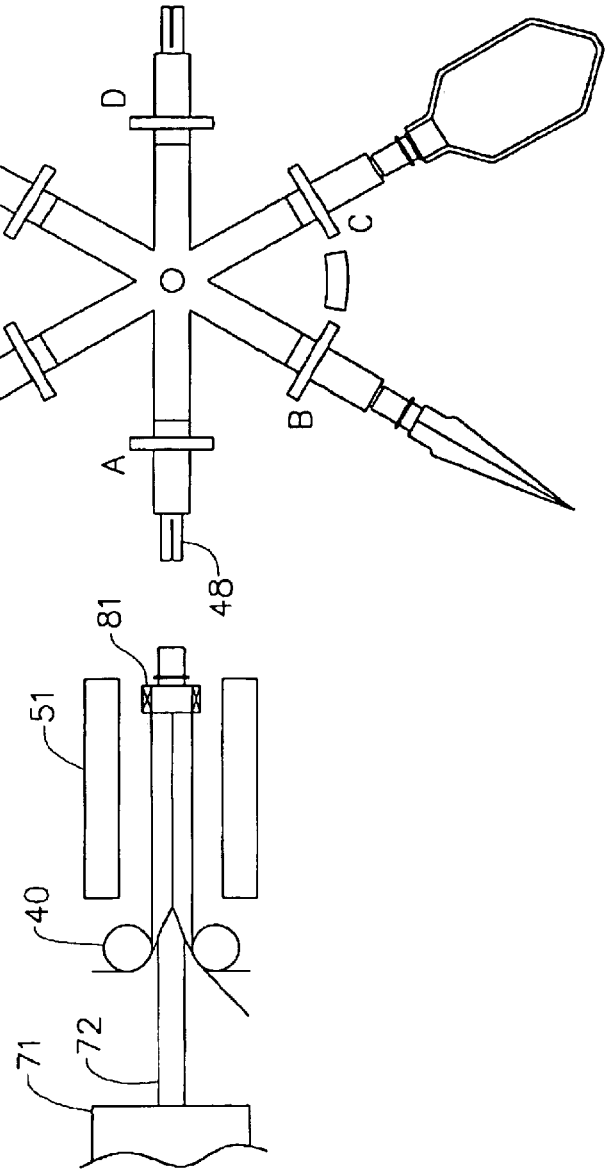

The invented bottle is intended to be fabricated from webs of flexible heat sealable plastic, foil, paper, or similar material. Two to four webs may be involved in "one up" fabrication, or three to five webs may be involved in "two up" fabrication. The number of webs used in each case is a matter of convenience.

There are many different web material compositions that could be suitable for the invented bottle, depending on the circumstances, and all of the webs do not necessarily have the same composition. It may, for example, be desirable to have some portions of the completed bottle stiffer than others, which can be accomplished by having differing compositions, or by differing web thicknesses. Or, it may be desired that one or more faces of the bottle be foil, while the others are plastic. Other factors may also dictate differences in web composition.

In addition to any requirements that may be imposed on the materials by the proposed use of the bottle, in order to be amenable to the preferred method of manufacture as described below, a composite sheet is generally used. It is preferable that the sheets (or webs) have one heat sealable surface, and the other not heat sealable. In other words, the sheets used should be such that one face of a first sheet is heat sealable to an abutting face of a second sheet, whereas the second face of the first sheet will not form a bond to the second face of the second sheet (at least not at the temperatures and pressures used to bond the first faces). It will be appreciated that the preferred method of manufacture could be modified to permit the use of materials, both faces of which are heat sealable.

One material that has been found to work well for fabricating items such as the invented bottle is a polyester sheet having a coating of low density polyethylene on one face. Many other materials are also suitable, the one mentioned being merely illustrative. The low density polyethylene coating has the property of being able to be sealed to a like coating on another sheet, but the polyester base sheet will not seal to another sheet of polyester. This selective sealing property of the film used permits gussets in the web to be conveniently formed, (i.e., without sealing the inside faces of the gussets to each other), yet permitting other laminations to be sealed to the gussets, as will be described below.

In the description which follows, the invented bottle is described as though it were fabricated from four webs (in a "one up" configuration), but it will be appreciated that it is contemplated that fabrication in accordance with the method described could be accomplished using as few as two webs. For descriptive purposes, the webs during the course of fabrication will be referred to as "top", "bottom", "left center", and "right center", corresponding to their relative positions when passing through the first stages of fabrication. After fabrication, what were originally the top and bottom webs (sometimes called laminations), will form the front and rear panels of the completed bottle, and will also form part of the top and bottom portions of the bottle. The center webs (the gussets) will form two side panels and also be part of the top and bottom portions of the bottle. The neck, being a part of the top portion of the bottle, is formed from extensions of the front, back, and gusseted side panels.

FIG. 1A shows the relative positions of the various webs (in a "one up" configuration) as they pass through the fabrication process. For clarity, the webs are shown separated and the seams not made. The constituent webs are top web 11, bottom web 12, left center web 13 and right center web 14. The two center webs are folded, and form gussets in the finished product. The numerals 13A and 14A indicate the inner extent of the gusset folds.

While the webs 11, 12, 13, and 14 are discussed herein as if they were separate pieces of material at the outset, it will be appreciated that any number of the seams between the webs could be "pre-made", as by folding one or more of the source webs to create the effect of a seam or seams. For example, if it were desired to fabricate the invented bottle from two webs instead of four, the bottom, left center, and right center webs could be a single folded web, instead of three separate webs.

It will be appreciated that when the bottle is complete, and contains liquid, the gussets will be open, and the bottle will have a substantially square or rectangular shape in cross section. Also, as will be noted below, even though the cross section is substantially rectangular, the body of the bottle may be shaped with pleasing curves in the vertical direction. When partially or completely full, the invented bottle is remarkably stable.

The faces of the top and bottom webs 11 and 12 that are coated with sealable material, (i.e. the low density polyethylene in the case of the illustrative web material) face toward the interior of the bottle, whereas the coated faces of the center webs 13 and 14 face outward of the gussets. Hence, it will be appreciated that when a sandwich including all of the webs is subjected to heat and pressure, only those faces which are coated with low density polyethylene will form seams, and the inside surfaces of the gussets (which are not coated) will not adhere.

FIG. 2 depicts the outline of a completed bottle, (except without the fitment), and with the gussets folded. What can be seen is top web 11, and the seam pattern 15. Section 1 is a portion of what will become the bottom, Section 2 is what will become the front panel, section 3 is a portion of the transition section, and section 4 is a portion of the bottle neck (where the fitment is placed). The dashed lines 13A and 14A indicate the folds of the gussets. The edges of the webs at section 1 preferably taper inward at approximately a 45° angle, terminating at approximately the inside edges of the gussets. Alternatively, the bottom could be cut straight across, without the 45° cuts. A bottle made in this manner would unfold to a flat bottom, as does the 45° cut embodiment, but it has been found that such a bottom does not contribute to quite as stable a structure as does the 45° cut bottom.

FIG. 3 is a trimetric view of one embodiment of a completed bottle as it would appear filled (partially or completely) with liquid or other flowable product. Front panel 21 (a part of web 11 during fabrication) is visible, as is transition section 26, neck 27, and fitment 28. The gusset which was the right center web 13 during fabrication can be seen as side panel 23. The rear panel and the other side panel cannot be seen. FIG. 3A is a trimetric view of a representative fitment 28, with the numeral 28A indicating the base of the fitment. A round base is illustrated, but as noted above, other shapes are also contemplated.

A presently preferred method of fabricating the invented bottle is illustrated in FIGS. 4 through 9. The "A" portion of each figure is a plan view showing the webs at a particular stage in the fabrication process as the webs pass through the fabricating machine, while the "B" portion is a side view. In order to promote clarity, all figures are somewhat schematic in nature. Since fabrication is a continuous repetitive process, the point in the process where explanation starts is somewhat arbitrary.

In general terms, the fabrication process proceeds as follows:

1. The perimeter seams which form the top portion of a bottle are formed (by the application of heat and pressure, or alternatively by ultrasonic or other means), and at the same time the extra material around the neck and the transition section is removed by "notching" the edges of the webs.
2. The fitment is inserted.
3. The partially formed bottle is then moved forward and attached to a suitable transport mechanism, for example the "ferris wheel" illustrated in the drawings.
4. The remainder of the perimeter seams are formed (i.e., the bottom portion—as well as the top portion for the next bottle) and the bottle is detached from the web.
5. The nascent bottles are moved to the next station (i.e., the ferris wheel is rotated) and the joint between the neck of the bottle and the fitment is sealed in two operations, the bottle being turned (preferably about) 90 degrees between sealing operations. Alternatively, of course, the sealing mechanisms (or possibly a single mechanism) could apply the pressure from differing angles.

For greater detail of the fabrication process, first refer to FIG. 4, where the webs 11, 12, 13, and 14 are seen being fed into the fabricating machine around a pair of idler rolls 40. A first nascent bottle 41 is seen being held at the end of an arm 47 of ferris wheel 42 at station A (the holding means (48) will be described later). At the time depicted in FIG. 4, the top portion of the perimeter seams for bottle 41 have been formed, and the fitment 28 has been placed, but the bottom portion of the bottle is still unseamed. Partially completed bottles 43 and 44 are attached to the ferris wheel at stations B and C. Ferris wheel 42 is rotatable by means not shown.

The next step, as shown in FIG. 5, seaming iron 51 has closed on the web, and is forming the top portion of the perimeter seams (15) for the next bottle (52), as well as the bottom portion of the perimeter seams for the bottle 41. When seaming iron 51 clamps the webs together, as noted previously, the inside surfaces of the gussets (not being coated) will not adhere, but seams will be formed between the gusset material and the top and bottom webs (since these abutting faces are coated with sealable material).

Figure 10:
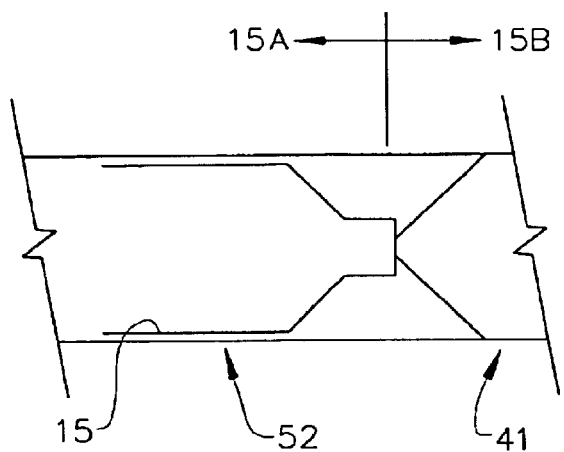
FIG. 10 depicts a seam pattern made by the seaming iron in accordance with one embodiment of the fabricating machine.

FIG. 10 illustrates an exemplary pattern of the perimeter seams 15 formed by seaming iron 51. The numeral 15A indicates the seams for the top portion of one bottle, while 15B indicates the seams for the bottom portion of the prior bottle. For clarity, only the seams made at one closing of seaming iron 51 are shown in the figure.

At the same time as the perimeter seams are being formed by seaming iron 51 (as illustrated in FIG. 5), a notching means which may be integral with the seaming iron—cuts the extraneous material (indicated by the numeral 53) from around the neck and transition areas of the bottle being formed, and also severs the web between bottles 41 and 52. The extraneous material (53) is commonly removed from the area by a vacuum system, and is discarded.

After the perimeter seams have been formed as described in the preceding paragraphs, and the web severed, the ferris wheel is rotated so that bottle 41, which was at station A, is rotated 60° (counterclockwise as viewed in the drawings) to station B. As the ferris wheel rotates, the seaming iron 51 members separate, as do the rollers comprising idler rolls 40. This is illustrated in FIG. 6.

When the idler rolls 40 are far enough apart, fitment driver 71 drives mandrel 72 (which has a fitment 28 positioned on its end) in through the open bottom of the bottle in process, and positions the fitment in the neck portion of the bottle (FIG. 7). Fitment handling and positioning on the mandrels such as mandrel 72 is known in the art and therefore is not further described. The fitment should fit reasonably closely to the neck portion of the bottle so that wrinkles do not appear when the neck is sealed to the fitment. The maximum looseness of fit depends in great measure on the particular circumstances, but in general, if the inner circumference of the neck is more than about 3% larger than the circumference of the base of the fitment, there is a danger of wrinkling. It may be desired to taper the base of fitment 28 somewhat as an aid to fitting it into the neck, After the fitment 28 is in place, clamp 81 (FIG. 8) clamps the bottle neck 27 to the fitment 28. Clamp 81 is preferably heated so that a first (at least temporary) bonding of the bottle material to the fitment is accomplished. Clamp 81 is then moved to engage the fitment with an arm of the ferris wheel (FIG. 9). The end 48 of the arm on which the bottle is held, is preferably split, is compliant, and has a slightly larger diameter at its end than the hole in the fitment (so as to hold the fitment from the inside). As the clamp 81 moves the nascent bottle to the position shown in FIG. 9, the idler rolls 40 turn as the material feeds.

After the bottle is in position and held by end 48, mandrel 72 is retracted. The clamp 81 is then released and moved back to its at rest position and a new fitment is positioned on the end of mandrel 72 (not illustrated).

At the end of the step described in connection with FIG. 9, the nascent bottle 52 that is held by an arm of the ferris wheel at station A is in same condition as bottle 41 was just before the step described in connection with FIG. 4. The next step, therefore, is to repeat the step of FIG. 4 by closing the idler rolls 40, following which the seaming iron 51 will create another set of perimeter seals, etc.

Stepping back to the time just after the rotation of the ferris wheel 42 to the position shown in FIG. 7, bottles 41, 43, and 44 can be seen attached at the ends of the arms 47 of the ferris wheel at stations B, C, and D. Bottle 44 is pulled off the ferris wheel leg at this time (by means not shown) and transferred to a packing station or to a bottle filling station.

Figures 11A, 11B:
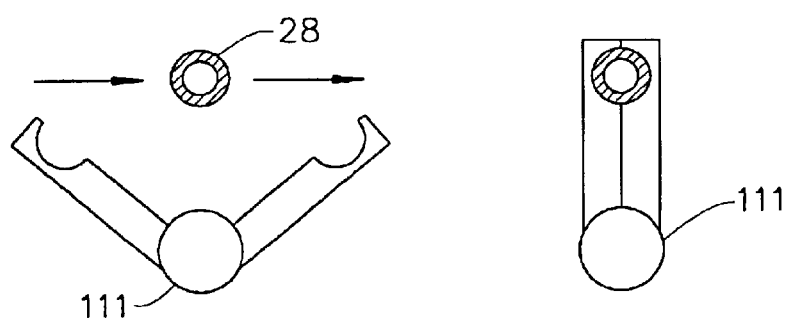
FIG. 11A is a top view of the seaming clamp used to create a seal between the bottle neck and the fitment, in an open condition.
FIG. 11B is a top view of the seaming clamp used to create a seal between the bottle neck and the fitment, in the closed condition.

A heated clamp 111 (as shown in FIGS. 11A and 11B) is located at each of stations B and C. When the ferris wheel is stopped during the steps of FIGS. 7, 8, 9, 4, and 5, both clamps 111 are closed around the base 28A of fitment 28 of the bottles which are then at stations B and C, as indicated in FIG. 11B, creating seals between the neck and the fitment. Just before the ferris wheel begins to turn again (FIG. 7), the clamps open (FIG. 11A) to allow the ferris wheel to move. For clarity, the clamps 111 are not shown in FIGS. 4–9.

Alternatively, instead of using heat and pressure, as applied by heated clamp 111, to seal the bottle neck to the fitment, the seals can be effected by applying ultrasonic energy to the interface. Similarly, the perimeter seams also may be made by using ultrasonic energy. Ultrasonic sealing is well known, and need not be described further.

The ends of the ferris wheel arms 47 are rotatable with respect to the arms, and, to effect such rotation, each end includes a gear or friction wheel 45 that engages a mating rack or friction pad 46 fastened to the machine frame between stations B and C. The length of the rack 46 is such that each arm end (and attached bottle) turns about 90° between stations B and C. The heated clamps 111 at stations B and C (which are heated hot enough, and apply sufficient clamping pressure to form a seal between the web material and the fitment) therefore provide a uniform seal between the neck of the bottle 27 and the fitment 28 around the circumference. The use of two heated clamps 111 to apply pressure to the sealing area at different radial angles assures that the needed sealing pressure is exerted on the fitment at all areas around the entire circumference, and thereby provides complete and reliable sealing.

Alternately, instead of turning the bottles, the two clamps could be positioned so as to apply clamping force from different directions. Another alternate method of sealing, that would be suitable for use with symmetrical fitments, would be to use only one heated clamp, actuating it twice, and causing it move angularly between actuations.

Figure 12:
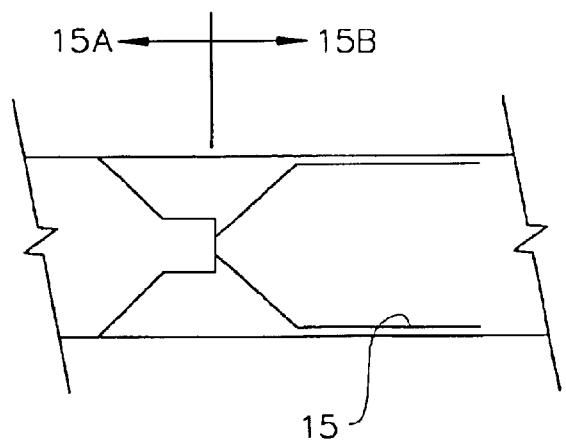
FIG. 12 depicts an alternate seaming pattern made by the seaming iron.

FIG. 12 depicts an alternate configuration of the seaming pattern for the perimeter seams. In the case of FIG. 12, the portion 2 (as shown in FIG. 2) is formed at the same time as portion 1 is formed, rather than at the time portions 3 and 4 are formed. Forming the seams in this manner will involve some differences in timing of the process, as will be apparent to those skilled in the art, but can be accommodated, if deemed convenient.

FIGS. 13A and B depict the fabrication of a bottle of the type shown in FIG. 3, except for the inclusion of a handle. The process is shown at the stage as depicted in FIG. 5, i.e., at the stage when the perimeter seals are being formed, and the excess material is cut away by notching means. In the embodiment shown in FIG. 13, the gusset webs 13 and 14 are introduced into the process prior to the introduction of the top and bottom webs 11 and 12. The gusset webs 13 and 14 are shown entering the process over idler roll 131. A hole punch 131 punches several small holes 132 through gusset web 14 at the first station. At the next stage, seaming iron 51 forms the perimeter seams as described previously, and also seals the top and bottom webs 11 and 12 together through the holes 132. At the same time, the notching means cuts a hole 133 through webs 11, 14, and 12. The remainder of the fabrication process is as described above in connection with the first embodiment, and the final product is a bottle having a handle 134.

FIG. 14 is intended to show that the body of the invented bottle need not be a rectangular parallelepiped (when filled). While a horizontal cross section of the the body is square or rectangular, the body may have a pleasing shape, as illustrated in FIG. 14, where a bottle 141 is shown with its sides notched out (as indicated by the numeral 142) providing an "hour glass" or other desirable shape. The notching preferably is accomplished at the same time as material 53 is cut away. The bottle of FIG. 14 is shown in the same condition as the bottle of FIG. 2, namely flat, and without fitment inserted.

For explanatory purposes, FIGS. 4–9 and 13 show a "ferris wheel" type of device for holding the bottles at spaced stations A, B, C, and D, and transporting them between stations. It will be appreciated by those skilled in the art that other suitable transport means could be used to accomplish the same function, i.e., a chain running around a pair of sprockets, a carousel, pallets travelling down a track, or other means.

At the outset, reference was made to the possibility of fabricating the invented bottle "two-up". FIG. 1B depicts a web configuration that could be used for "two-up" production. Webs 11A, 12A, 13A, and 14A correspond to webs 11, 12, 13, and 14 of FIG. 1A. An additional web 16 (with two folds) occupies the central area. It will be appreciated that by slitting the web configuration depicted in FIG. 1B down the middle, two webs of the configuration shown in FIG. 1A will be created. Hence, the web configuration shown in FIG. 1B can result in two lines proceeding side by side, utilizing two ferris wheels, two fitment arms, etc. Of course, at some point during fabrication, preferably just before attachment of the nascent bottles to the ferris wheel, the web must be slit into two parallel webs. Slitting webs is a common procedure in the art, and, accordingly, need not be discussed in detail.

What has been described is a novel flexible bottle, with a fitment, and a method for fabricating same. These have been described in detail with reference to specific embodiments. Persons skilled in the art will, no doubt, utilize the principles disclosed herein in connection with embodiments differing in some details from those described, but nevertheless within the spirit of the invention as defined in the below claims. Such changed embodiments, as well as such changes in the process of making the invented bottle as will occur to those skilled in the art, are intended to be covered by the following claims, which define the invention.

I claim:

1. A bottle fabricated from flexible webs and including a fitment which comprises:

a bottom section;

a body section comprising a front panel, a rear panel, and a pair of gusseted side panels, each of said front panel, rear panel and gusseted side panels having predetermined widths;

a neck section formed from extended portions of said front and rear panels and extended portions of said gusseted side panels, the widths of said extended portions of said front and rear panels and said gusseted side panels being reduced at said neck section;

a tapered transition section between said body section and said neck section; and a fitment having a cylindrical base positioned within said neck section and sealed to said extended portions of said front and rear panels and to said extended portions of said gusseted side panels, a remaining portion of said fitment extending beyond said neck section away from said tapered transition section, a circumference of said cylindrical base being equal to or greater than a circumference of said remaining portion.

2. A bottle as recited in claim 1 wherein the side edges of said front panel, said rear panel, and said pair of gusseted side panels are contoured.

3. A bottle as recited in claim 1 wherein said bottom portion is formed from extended portions portions of said front and rear panels and said gusseted side panels, the edges of said extended portions tapering at an angle of about 45 degrees.

4. A bottle as recited in claim 1 and further including a handle portion defining a hole and extending from said transition and neck sections.

5. A bottle fabricated from flexible webs and including a fitment which comprises:

a bottom section;

a body section comprising a front panel, a rear panel, and a pair of gusseted side panels, each of said front panel, rear panel and gusseted side panels having predetermined widths;

a neck section formed from extended portions of said front and rear panels and extended portions of said gusseted side panels, the widths of said extended portions of said front and rear panels and gusseted side panels being reduced at said neck section;

a tapered transition section between said body section and said neck section; and a fitment having a cylindrical base positioned within said neck section, said cylindrical base being sealed to said extended portions of said front and rear panels and to said extended portions of said gusseted side panels, a remaining portion of said fitment extending beyond said neck section away from said tapered transition section, a circumference of said cylindrical base being equal to or greater than a circumference of said remaining portion.

6. A bottle as recited in claim 5 wherein the side edges of said front panel, said rear panel, and said pair of gusseted side panels are contoured.

7. A bottle as recited in claim 5 wherein said bottom portion is formed from extended portions of said front and rear panels and said gusseted side panels, the edges of said extended portions tapering at an angle of about 45 degrees.

8. A bottle as recited in claim 5 and further including a handle portion defining a hole and extending from said transition and neck sections.

9. A bottle as recited in claim 5 wherein said cylindrical base of said fitment is tapered.

10. A bottle as recited in claim 5 wherein said cylindrical base of said fitment is closely fitted to said neck section.

11. A container fabricated from flexible webs and including a fitment which comprises:

a bottom section;

a body section comprising a front panel, a rear panel, and a pair of gusseted side panels;

a neck section formed from extended portions of said front and rear panels and extended portions of said gusseted side panels, a pyramidal transition section between said body section and said neck section, said front panel, rear panel and gusseted side panels each tapering in width from their widths at said body section to smaller widths at said neck section; and a fitment having a cylindrical base positioned within said neck section, said cylindrical base being sealed to said extended portions of said front and rear panels and to said extended portions of said gusseted side panels, a remaining portion of said fitment extending beyond said neck section away from said tapered transition section, a circumference of said cylindrical base being equal to or greater than a circumference of said remaining portion.

12. A container as recited in claim 11 wherein the side edges of said front panel, said rear panel, and said pair of gusseted side panels are contoured.

13. A container as recited in claim 11 wherein said bottom portion is formed from extended portions of said front and rear panels and said gusseted side panels, the edges of said extended portions tapering at an angle of about 45 degrees.

14. A container as recited in claim 11 and further including a handle portion defining a hole and extending from said transition and neck sections.

15. A container as recited in claim 11 wherein said cylindrical base of said fitment is tapered.

16. A container as recited in claim 11 wherein said cylindrical base of said fitment is closely fitted to said neck section.

17. A bottle fabricated from flexible webs and including a fitment which comprises:

a bottom section;

a body section comprising a front panel, a rear panel, and a pair of gusseted side panels, each of said front panel, rear panel and gusseted side panels having predetermined widths;

a neck section formed from extended portions of at least said front and rear panels, the widths of said extended portions of said front and rear panels being reduced at said neck section;

a tapered transition section between said body section and said neck section, the widths of said front and rear panels and said gusseted side panels tapering in width between said body section and said neck section; and a fitment having a cylindrical base positioned within said neck section, said cylindrical base being sealed to at least said extended portions of said front and rear panels and to said extended portions of said gusseted side panels, a remaining portion of said fitment extending beyond said neck section away from said tapered transition section, a circumference of said cylindrical base being equal to or greater than a circumference of said remaining portion.

18. A bottle as recited in claim 17 wherein the side edges of said front panel I said rear panel, and said pair of gusseted side panels are contoured.

19. A bottle as recited in claim 17 wherein said bottom portion is formed from extended portions of said front and rear panels and said gusseted side panels, the edge of said extended portions tapering at an angle of about 45 degrees.

20. A bottle as recited in claim 17 and further including a handle portion defining a hole and extending from said transition and neck sections.

21. A bottle as recited in claim 17 wherein said cylindrical base of said fitment is tapered.

22. A bottle as recited in claim 17 wherein said cylindrical base of said fitment is closely fitted to said neck section.

* * * * *